April 10, 1951   T. P. DAVENPORT   2,548,202
MANEUVERING MACHINE
Filed Nov. 18, 1949   3 Sheets-Sheet 1

INVENTOR.
THERON P. DAVENPORT
BY
ATTORNEY

April 10, 1951        T. P. DAVENPORT        2,548,202
MANEUVERING MACHINE
Filed Nov. 18, 1949        3 Sheets-Sheet 2
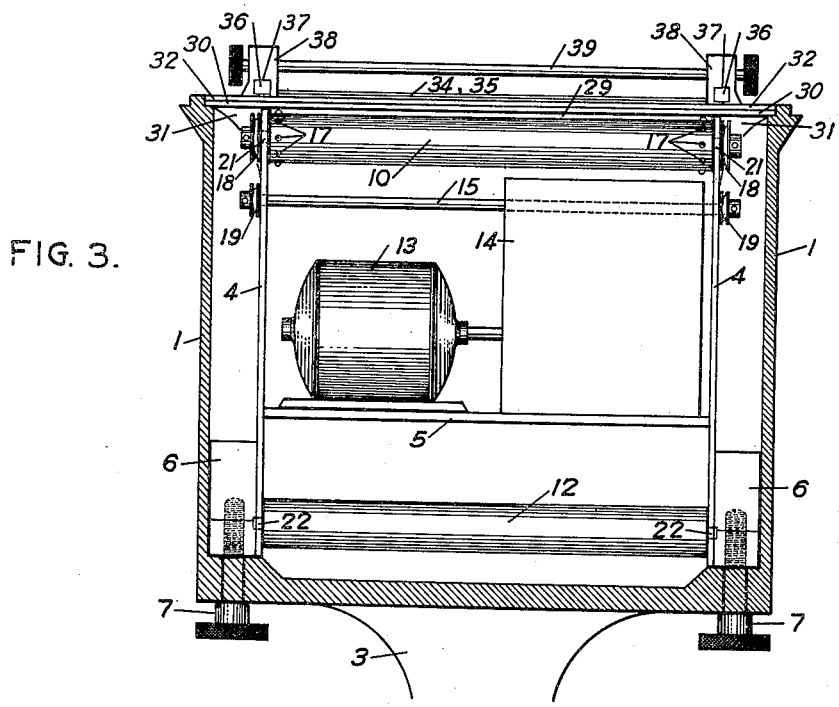
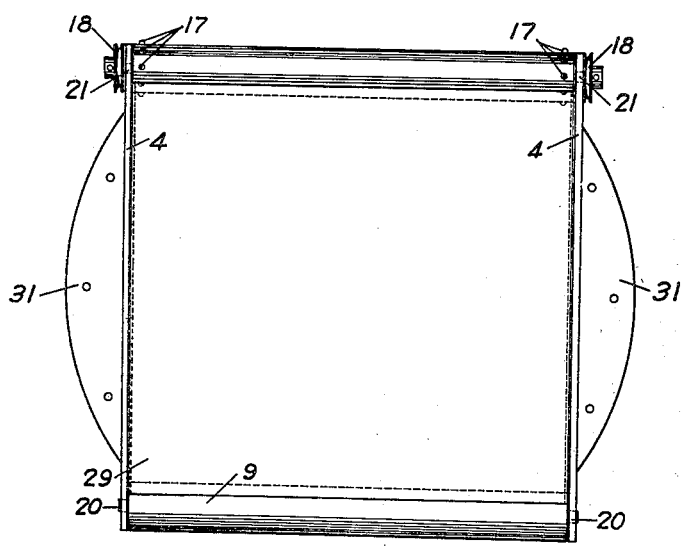
INVENTOR.
THERON P. DAVENPORT
BY
ATTORNEY Patented Apr. 10, 1951

2,548,202

UNITED STATES PATENT OFFICE 2,548,202

MANEUVERING MACHINE

Theron P. Davenport, Port Neches, Tex.

Application November 18, 1949, Serial No. 128,202

1 Claim. (Cl. 33—76)

The invention concerns a computing and plotting device which may be used in connection with commercial radar installations on board merchant vessels for the purpose of computing the courses and speeds of one or more known or unknown obstacles which may be observed by radar while navigating in dense fog or other low visibility, thus enabling the shipmaster on the observing vessel to navigate his ship in such a manner as to avoid collision.

The invention is more particularly adapted for commercial purposes and finds its greatest use in permitting the shipmaster to quickly and accurately determine the course and speed, point of passing ahead and point of closest approach of all known or unknown obstacles within the normal operating range of commercial radar at sea.

An advantageous feature of the invention is that the device may be operated in conjunction with any existing commercial or military radar installation without altering its design. Being manually operated, except for the electrically driven chart, it is not dependent on electrical or mechanical connections with the radar set. The recording of the information obtained from the radar scope is plotted by the operator in the same manner in which distance and direction measurements are plotted on a stationary plotting sheet or navigational chart, and is not in any way dependent on wave impulses. The number of problems which may be solved simultaneously is limited only by the skill of the operator. Any shipmaster or deck officer may operate the device effectively without prior instruction.

The cost of producing the device is relatively small and well within the means of even the smallest ship operating company.

The need for such a device has been amply demonstrated by the numerous collisions and near collisions occurring between radar equipped vessels while operating in fog or other low visibility. It is believed that this device will prove more satisfactory than methods heretofore used in determining the course, speed and closest approach of other vessels inasmuch as the actual movement of the vessel over the earth is projected upon a moving chart geared to the speed of the ship, thus giving a true picture of the relation of movement between the vessels involved in the problem. An important feature is the reliable running check which may be maintained on the course and speed of approaching, crossing, overtaken or overtaking vessels. A few simple movements of the new type parallel rule within the bearing circle, in plotting the information received from the radar scope, will immediately indicate any deviation in the course or speed of the observed vessel.

The machine is small and compact, and may be constructed either for mounting on a pedestal or hinged to a bulkhead of the pilot house readily available to the master or watch officer.

By slightly altering the design the machine may be made to carry a strip chart of harbor channels showing buoys, lightships, lighthouses, ranges and other objects close to the channel of immediate concern to the navigator while navigating by radar in dense fog. The speed of the chart is synchronized with the speed of the ship over the earth. Departure is taken from a known position, such as a lightship or buoy, and the indications of the chart are made to correspond with this position. If the speed has been accurately determined the ship should arrive at various known positions at the same instant as indicated on the chart. This is of great value when interpreting the information given by radar, as the indications of the scope should correspond with that of the moving chart, thereby greatly reducing the chances of an error in piloting in confined waters.

The endless charts may be removed from the machine at any time, and offer positive evidence of all radar information plotted.

The machine is rugged in construction and has few moving parts. Anyone familiar with radar and plotting bearings may operate the machine effectively without prior instruction.

The machine is capable of producing extremely rapid and accurate solutions to problems of maneuvering from information presented by the radar scope. No special technical training is required. Any watch officer capable of operating and obtaining ranges and bearings from the radar may apply this information to the maneuvering machine and obtain an accurate solution to problems relating to the course and speed of approaching or crossing vessels when navigating in dense fog on the busy traffic lanes of the seas.

The speed control rheostat, which synchronizes the speed of the chart with that of the ship, is the only adjustment required to place the machine in operation. The presentation of the chart and the basic design of the bearing circle and parallel rule are similar to that to which the ocean navigator has long been accustomed.

The invention will be readily understood by referring to the following description and the accompanying drawing, in which:

Fig. 3 is a sectional view in elevation taken on the line 3—3 of Fig. 2.

Fig. 4 is a top view of the machine with the bearing circle and parallel rule removed.

Figure 1:
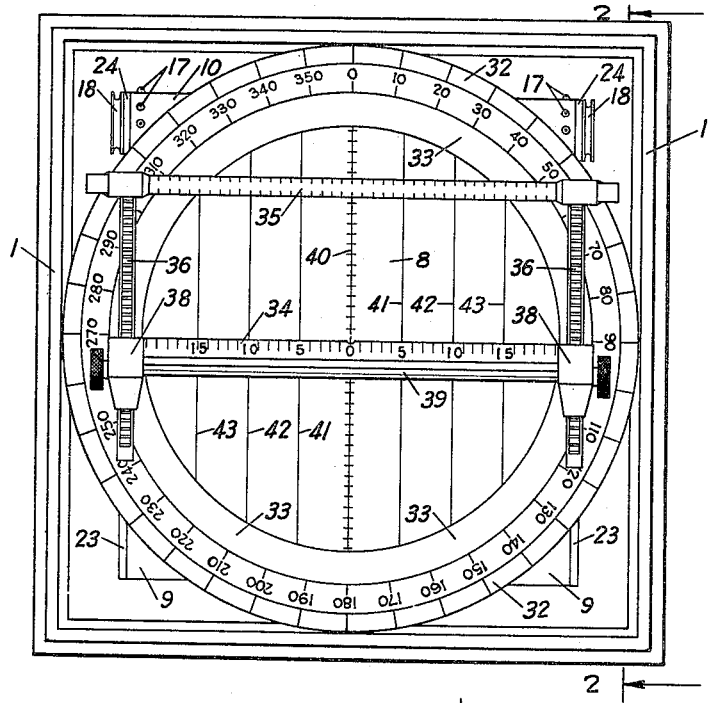
Fig. 1 is a top view of a maneuvering machine embodying the invention.
Figure 2:
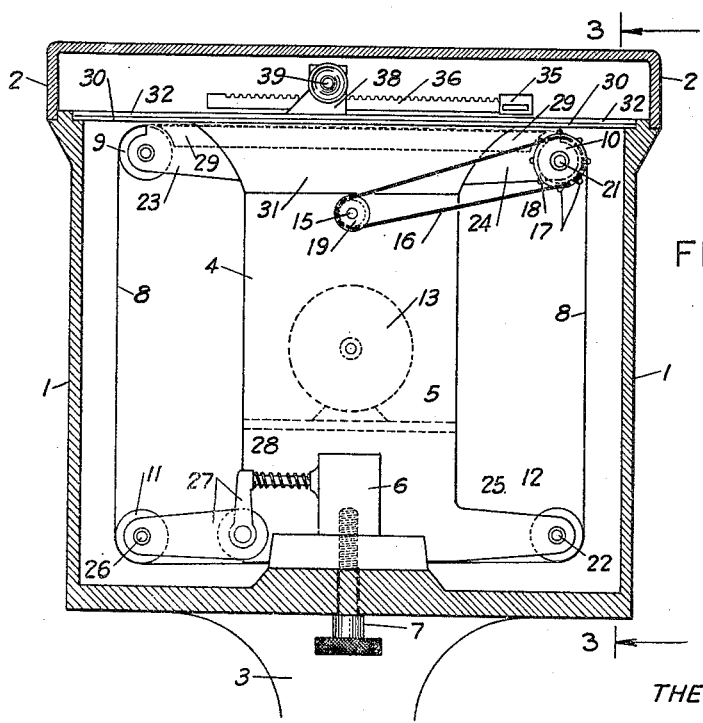
Fig. 2 is a sectional view in elevation taken on the line 2—2 of Fig. 1.
Figure 6:
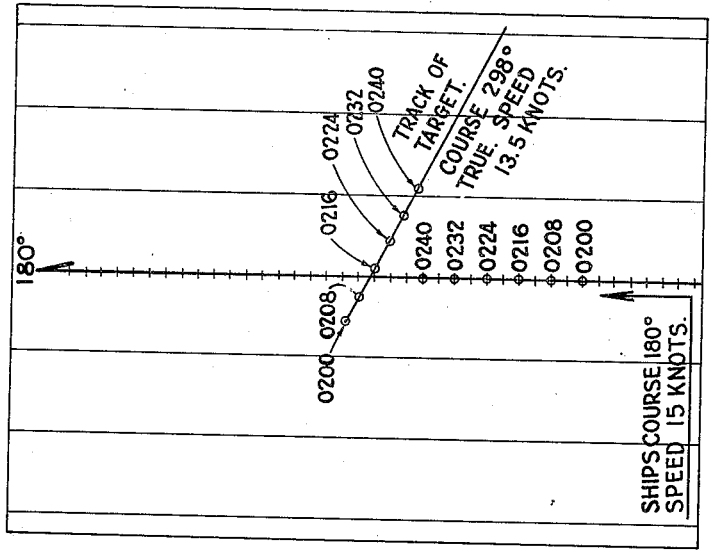
Fig. 6 shows a section of the chart used in solving the problem described hereinafter as Example 2.
Figure 5:
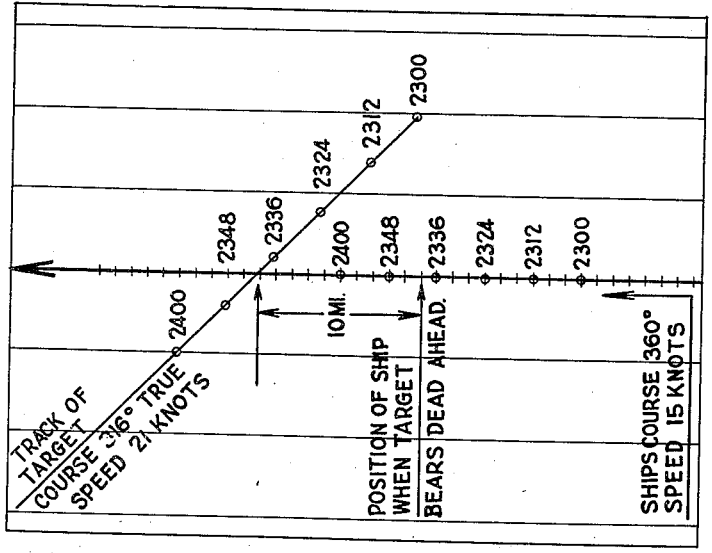
Fig. 5 shows a section of the chart used in solving the problem described hereinafter as Example 1.

Referring to the drawing, a casing 1 is provided, the casing 1 having a cover 2. The casing 1 may be mounted on either a pedestal or a bulkhead, the numeral 3 indicating the upper portion of a pedestal. A chassis comprising a pair of side members 4 and a connecting shelf-like member 5 is disposed within the casing 1 and is secured therein by a pair of clamping members 6. The clamping members 6 are secured to the lower portions of the side members 4 and are adapted to receive thumb screws 7 which extend thru the bottom of the casing 1.

An endless, paper covered, sheet brass chart 8 is mounted on rollers 9, 10, 11 and 12 and is adapted to be moved at a speed synchronized with that of the ship. The chart 8 is driven by a small fractional horsepower variable speed electric motor 13 through a series of reduction gears 14, a drive shaft 15, a pair of belts 16 and the roller 10, which is a driven roller. The speed of the chart 8 is controlled by a manually operated rheostat (not shown), which is calibrated in knots.

The motor 13 and the reduction gears 14 are supported upon the shelf-like member 5, while the drive shaft 15 is supported at its ends in bearings formed in the side members 4. The driven roller 10, which is located at the top and forward end of the machine, is fitted with teeth 17 around its extreme ends which engage corresponding slots in the chart 8. The driven roller 10 is connected to the drive shaft 15 by the belts 16, sheaves 18 and 19 being provided for the belts 16 at the ends of the driven roller 10 and the drive shaft 15, respectively. Thus any movement of the motor 13 is transmitted to the chart 8.

The driven roller 10 and rollers 9 and 12, which are idler rollers, are carried in bearings 20, 21 and 22 on arms 23, 24 and 25 extended in a fixed position from side members 4. Roller 11, which is also an idler roller, is carried in bearings 26 which are mounted at the ends of levers 27. The levers 27 are pivotally secured to the side members 4, and the ends thereof opposite the bearings 26 are acted upon by springs 28 which bear against the clamping members 6. This arrangement maintains tension on the chart 8, and also permits the chart 8 to be removed and replaced.

A bearing and guide plate 29, over which the chart 8 moves, is secured between the side members 4 adjacent the upper edges thereof. The plate 29 provides a solid working surface beneath the chart 8 when bearings are being plotted.

An annular plate 30 is mounted on flanges 31, the flanges 31 being secured to the outer surfaces of the side members 4, adjacent the upper edges thereof. The plate 30 is centered directly over the bearing and guide plate 29. The plate 30 carries a bearing circle 32 on its outer width. The bearing circle 32 is graduated in degrees (0 to 360), and may be set and clamped to read either true or relative bearings.

A mounting ring 33, which may be rotated within the bearing circle 32, and which carries the new type parallel rule hereinafter described, is supported upon the inner width of the plate 30. The parallel rule, which has been designed to meet the special requirements of this machine, may be swung in azimuth through 360 degrees. It includes a fixed arm 34, which is disposed across the center of the bearing circle 32 and is securely fastened at its ends in sockets provided on the mounting ring 33. The fixed arm 34 advantageously is made of transparent plastic, as is a movable arm 35, and is graduated at intervals representing knots or yards. The fixed arm 34 is used to plot the bearing and distance of the target. The movable arm 35, or course and speed arm, is secured at its ends to a pair of racks 36, which are fitted in bearings 37 on the mounting ring 33 and operated, in or out as the case may be, by a pair of pinion gears 38. The gears 38 are secured to the ends of a shaft 39 which is rotatably mounted on the mounting ring 33 and is provided with knobs for turning it. The movable arm 35 is graduated at intervals representing knots or yards, and is used in determining the course and speed of the target vessel.

The working area of the chart 8 enclosed by the bearing circle 32 and the mounting ring 33 represents either miles or yards as required by circumstances of the problem involved, and covers the extreme range of commercial radar in normal operation at sea. As shown in Fig. 1, the chart 8 is graduated at intervals representing knots along a line 40 drawn through the center of the chart 8. Line 40 represents the ship's track. Parallel lines 41, 42 and 43 are drawn at intervals, representing knots or yards, on each side of the center line 40. Lines 41, 42 and 43 facilitate plotting, allowing the operator to determine at a glance the approximate distance of the target ship.

Charts 8 may be replaced by removing the plate 30, carrying the bearing circle 32 and the parallel rule, and lifting the chassis from the casing 1. Upon releasing the tension on the roller 11 the chart 8 may be removed and replaced from the side.

To illustrate the simplicity of operation two problems are presented:

*Example 1*

Assume that the observing vessel is navigating in dense fog, with radar operating perfectly and the ship on course 360 degrees true, speed 15 knots and maneuvering machine synchronized to this speed. At 2300 a target is observed on the scope bearing 45 degrees true, distance 14 miles. The parallel rule is rotated and lined up with 45 degrees on the bearing circle 32, and the distance measured on the fixed arm 34 of the rule. A small dot, together with any note of time, is located at this point. At 2312 the target bears 35 degrees true, distance 12 miles. A second dot is located upon the chart at this point and the parallel rule swung in azimuth until the outer, movable arm 35 is made to intersect and line up with the first and second dots. Since the target is moving from right to left the course is read in the left semi-circle of the bearing circle 32 at the point of intersection with the pointer attached to each end of the fixed arm 34 of the rule. In this case the course is found to be 316 degrees true. The true speed of the target is read on the outer arm 35, the distance between the two dots being 4.2 miles. Since the time between the first and second bearing was 12 minutes, or ⅕ hour, the speed of the target is 21 knots. By projecting the line joining the position dots across the center line 40 the point of closest approach, together with the time and distance when the target is dead ahead on the ship's track, may be ascertained. By plotting subsequent positions along the target's projected track any deviation from the course or speed will be immediately in evidence.

To carry the problem further, at 2324 target bore 22 degrees, distance 10.8 miles. At 2336 target bore 006 degrees, distance 10 miles (closest approach). At 2340 target crossed dead ahead at 10 miles distance. At 2348 target bore 349 degrees, distance 10.2 miles, and at 2400 target bore 334 degrees, distance 11.1 miles. Danger of collision with this vessel is past and the data may be erased from the chart 8, which is then ready for the next problem, or if desired, the chart 8 may be retained as a record.

*Example 2*

Assume that the observing vessel is proceeding in dense fog on course 180 degrees true, speed 15 knots, with radar in normal operation and maneuvering machine set to the ship's course and speed. At 0200 a target is observed on the scope bearing 170 degrees true at 15 miles distance. This position is plotted on the maneuvering machine as described in Example 1, and the target kept under continuous observation. At 0208 the target bears 175 degrees true, 12 miles distance. This second position is plotted on the machine and the target's course and speed determined. In this case the target ship is found to be on true course 298 degrees and advancing along its track at the rate of 1.8 miles in eight minutes, giving it an hourly speed of 13.5 knots. The target ship's course line is projected across the chart 8 as described in Example 1, and its position plotted at intervals of 8 minutes, or 1.8 miles, along this track. Radar bearings are taken at 8 minute intervals (note below) and checked with the predicted positions along the track, thus indicating that the target ship is holding its original course and speed.

At 0216 target bore 183 degrees true, distance 9 miles.

At 0224 target bore 200 degrees true, distance 6.6 miles.

¹At 0232 target bore 230 degrees true, distance 5 miles.

At 0240 target bore 265 degrees true, distance 5.5 miles.

At 0248 target bore 290 degrees true, distance 7.5 miles.

¹ Closest approach.

The word "target" as used herein is not to be confused with targets referred to in military science. During the war an object detected by radar was assumed until proven otherwise to be a foe, and hence a potential target. For this reason the word "target" is now used generally to denote any object capable of being observed by radar. To the navigator it means something to miss rather than something to hit.

The invention may be modified in various ways without departing from the spirit and scope thereof.

I claim:

A computing and plotting device comprising a supporting frame, a plurality of rollers mounted on the frame, one of the rollers being a driven roller, a continuous chart mounted on the rollers and adapted to be moved longitudinally upon rotation of the driven roller, means for rotating the driven roller at predetermined speeds, a planular member mounted on the frame and disposed immediately adjacent the under side of the chart, an annular plate mounted on the frame and disposed immediately adjacent the upper side of the chart, a bearing circle carried by the annular plate, a mounting ring rotatably mounted with respect to the annular plate and disposed concentrically with respect to the bearing circle, and a parallel rule mounted on the mounting ring, the parallel rule including a fixed arm which is disposed across the center of the bearing circle and is secured at its ends to the mounting ring, a pair of racks slidably mounted on the mounting ring and disposed transversely with respect to the fixed arm, a movable arm secured at its ends to the racks and disposed in parallel relation with the fixed arm, a pair of pinion gears rotatably mounted on the mounting ring and acting upon the racks to move them longitudinally, and means for manipulating the pinion gears manually.

THERON P. DAVENPORT.

REFERENCES CITED

The following references are of record in the file of this patent:

UNITED STATES PATENTS

| Number | Name | Date |
| --- | --- | --- |
| 10,133 | Hinkley | Oct. 18, 1853 |
| 586,975 | O'Neal | July 27, 1897 |
| 964,773 | Guillo | July 19, 1910 |
| 1,098,621 | Gist | June 2, 1914 |
| 1,896,997 | Bennett | Feb. 7, 1933 |
| 2,437,243 | Curtis | Mar. 9, 1948 |
| 2,438,522 | Smith | Mar. 30, 1948 |

FOREIGN PATENTS

| Number | Country | Date |
| --- | --- | --- |
| 4,311 | Great Britain | Feb. 21, 1907 |
| 22,117 | Great Britain | Oct. 1, 1913 |
| 827,798 | Switzerland | Apr. 1, 1920 |